US008584232B2

(12) United States Patent
Kerschbaum

(10) Patent No.: US 8,584,232 B2
(45) Date of Patent: Nov. 12, 2013

(54) ENHANCED CROSS-SITE ATTACK PREVENTION

(75) Inventor: Florian Kerschbaum, Karlsruhe (DE)

(73) Assignee: SAP AG, Walldorf (DE)

(*) Notice: Subject to any disclaimer, the term of this patent is extended or adjusted under 35 U.S.C. 154(b) by 1298 days.

(21) Appl. No.: 11/738,912

(22) Filed: Apr. 23, 2007

(65) Prior Publication Data
US 2008/0263650 A1    Oct. 23, 2008

(51) Int. Cl.
G06F 11/00 (2006.01)
G06F 12/14 (2006.01)
G06F 12/16 (2006.01)
G08B 23/00 (2006.01)

(52) U.S. Cl.
USPC .................. 726/22; 726/12; 726/23

(58) Field of Classification Search
USPC .............. 726/12, 23, 27, 22; 713/160, 161; 705/10, 35, 39
See application file for complete search history.

(56) References Cited

U.S. PATENT DOCUMENTS

| 6,658,400 | B2* | 12/2003 | Perell et al. ............... | 1/1 |
| 7,370,011 | B2* | 5/2008 | Bennett et al. ............ | 705/39 |
| 7,424,445 | B1* | 9/2008 | Cue et al. .................. | 705/26 |
| 2004/0003293 | A1 | 1/2004 | Viets et al. | |
| 2004/0168083 | A1 | 8/2004 | Gasparini et al. | |
| 2006/0098795 | A1* | 5/2006 | Choti et al. ............... | 379/114.14 |
| 2007/0136809 | A1* | 6/2007 | Kim et al. ................. | 726/22 |
| 2008/0127323 | A1* | 5/2008 | Soin et al. ................. | 726/12 |

OTHER PUBLICATIONS

Martin Johns and Justus Winter, "RequestRodeo: Client Side Protection against Session Riding", May 27, 2006, Secologic, http://www.secologic.org/publications.*

"Secure Session Management: Preventing Security Voids in Web Applications", Luke Murphey, Jan. 10, 2005, SANS Institute, pp. 1-28.*

"Noxes: A Client-Side Solution for Mitigating Cross-Site Scripting Attacks", Engin Kirda, Christopher Kruegel, Giovanni Vigna, and Nenad Jovanovic, 2006, ACM, pp. 330-337.*

'Cross Site Scripting' [online]. Wehrmann, 2004, [retrieved on Apr. 9, 2007]. Retrieved from the Internet: <URL: http://md.hudora.de/presentations/wehrmann-xss.pdf>, 24 pages.

(Continued)

Primary Examiner — Ashok Patel
Assistant Examiner — Daniel Potratz
(74) Attorney, Agent, or Firm — Fish & Richardson P.C.

(57) ABSTRACT

Efficient cross-site attack prevention, in which web pages are stored on a site, the web pages being organized into entry pages that do not accept input, and protected pages that are not entry pages. A request is received from a user application to receive a requested web page, the request including a referrer string indicative of a referring web page, and identification data. It is determined whether the requested web page is an entry page or a protected page, and it is further determined, if the requested web page is determined to be a protected page, if the user application is authorized based upon the identification data, and if the referring web page is stored on the site based upon the referrer string. The requested web page is transmitted to the user application if the user application is determined to be authorized and if the referring web page is determined to be stored on the site, and the request is redirected to an entry page if the user application is determined to be not authorized or if the referring web page is determined to be not stored on the site.

19 Claims, 11 Drawing Sheets

(56) References Cited

OTHER PUBLICATIONS

'Defending against Injection Attacks through Context-Sensitive String Evaluation' [online]. Pietraszek, 2005 [retrieved on Apr. 9, 2007]. Retrieved from the Internet: <URL: http://tadek.pietraszek.org/publications/pietraszek05_defending.pdf>, 26 pages.

'Noxes: A Client-Side Solution for Mitigating Cross-Site Attacks' [online]. Kirda et al., 2006, [retrieved on Apr. 9, 2007]. Retrieved from the Internet: <URL: http://www.seclab.tuwien.ac.at/papers/noxes.pdf, 8 pages.

'SessionSafe: Implementing XSS Immune Session Handling' [online]. Johns, 2006, [retrieved on Apr. 9, 2007]. Retrieved from the Internet: <URL: www.informatik.uni-hamburg.de/SVS/papers/2006¯esorics_SessionSafe.pdf>, pp. 444-460.

'Preventing Cross Site Request Forgery Attacks' [online]. Jovanovic et al., Aug. 2006, [retrieved on Apr. 9, 2007]. Retrieved from the Internet: <URL: www.seclab.tuwien.ac.at/papers/noforge.pdf>, 10 pages.

'Cross-Site Scripting Prevention with Dynamic Data Tainting and Static Analysis' [online]. Vogt et al., Feb. 2007, [retrieved on Apr. 9, 2007]. Retrieved from the Internet: <URL:www.seclab.tuwien.ac.at/papers/xss_prevention.pdf>, 12 pages.

* cited by examiner

800

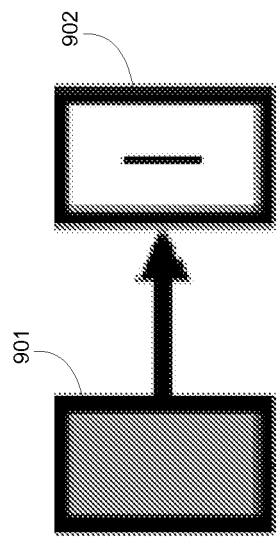
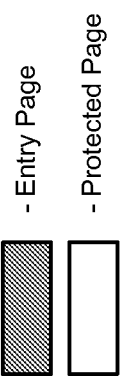
FIG. 9
900

ENHANCED CROSS-SITE ATTACK PREVENTION

FIELD

The present disclosure generally relates to the prevention of cross-site attacks, and at least one particular implementation relates to the prevention of cross-site scripting and cross-site request forgery attacks.

BACKGROUND

Although web applications operate in a virtual environment, some of them, including online auction or banking applications, involve real-world monetary transactions. Both web users and web sites have a vested interest in protecting these monetary transactions, which present attractive targets for manipulation by hackers.

Malicious exploitations of critical vulnerabilities of these security-critical web applications are continuously being devised, with cross-site scripting attacks and cross-site request forgery attacks being particularly favored by hackers. The vanguard of these attacks is a malicious link that has been tainted with scripting or forged input, which is presented to a legitimate user by way of an electronic communication. When the legitimate user innocently selects this malicious link, a script is enabled to execute in the security context of the user's browser and the target web site.

Although conventional client-side and server-side techniques exist to protect against cross-site attacks, these approaches are often deficient. For example, some of these typical approaches only address session theft attacks, which attack the integrity of the session.

SUMMARY

According to one general implementation, web pages are stored on a site, the web pages being organized into entry pages that do not accept input, and protected pages that are not entry pages, and a web browser application is authenticated, at the site, based upon a user identifier and a secret key. An identification cookie is transmitted from the site to the web browser application based upon authenticating the web browser application, and a request is received at a gateway from the web browser application to receive a requested web page, the request including a Hypertext Transfer Protocol ("HTTP") referer string including a uniform resource location ("URL") of a referring web page, and the identification cookie. It is determined, at the gateway, whether the requested web page is an entry page or a protected page. If the requested web page is determined to be a protected page, it is further determined at the gateway if the web browser is authenticated based upon the received identification cookie, and if the referring web page is stored on the site based upon the HTTP referer string. The requested web page is transmitted from the site to the web browser application if the web browser application is determined to be authenticated and if the referring web page is determined to be stored on the site, and the request is redirected, at the gateway, to one of the entry pages if the web browser application is determined to be not authenticated or if the referring web page is determined to be not stored on the site. Input data from the request is removed at the gateway if the requested web page is determined to be an entry age or if the request is redirected to an entry page, to thereby produce a stripped request, and one of the entry pages is transmitted from the site to the web browser application based upon producing the stripped request, if the requested web page is determined to be an entry page or if the request is redirected to an entry page.

According to another general implementation, web pages are stored on a site, the web pages being organized into entry pages that do not accept input, and protected pages that are not entry pages. A request is received from a user application to receive a requested web page, the request including a referrer string indicative of a referring web page, and identification data, and it is determined whether the requested web page is an entry page or a protected page. If the requested web page is determined to be a protected page, it is determined if the user application is authorized based upon the identification data, and if the referring web page is stored on the site based upon the referrer string, and the requested web page is transmitted to the user application if the user application is determined to be authorized and if the referring web page is determined to be stored on the site. The request is redirected to one of the entry pages if the user application is determined to be not authorized or if the referring web page is determined to be not stored on the site.

Implementations may include one or more of the following features. For example, input date may be removed from the request if the requested web page is determined to be an entry page or if the request is redirected to an entry page, to thereby produce a stripped request, and the entry page may be transmitted to the user application based upon the stripped request. The user application may be authorized or authenticated, at the site, for example using a secret key, using a session URL, using HTTP authentication, or user application-side secure sockets layer ("SSL"). The identification data, which may be a cookie, may be transmitted from the site to the user application based upon authenticating the user application. The web pages may be organized into the entry pages and the protected pages, at the site. The request may be received at a gateway. The protected pages may further include applications, servlets, or scripts. Using a user application backwards navigation control, navigating between protected pages may occur. The user application may be a web browser application executed on a user device. The referrer string may be a HTTP referer string, and may store a URL of the referring web page.

In further examples, at least one entry page may be a login page, a home page, or a portal front page. The site may be an online banking web site, an auction web site, an online retail web site, a web-mail web site, a search engine web site, or an SAP® portal web site. The protected page may be an online banking transaction page, an online banking menu page, an online banking authentication page, an online auction search results, page, an online auction login page, an online auction authentication page, an online auction bid entry page, an online auction bid verification page, an online retailer search results page, an online retailer shopping cart page, an online retailer login page, an online retailer credit card address verification page, an online retailer confirmation page, a web mail authentication page, a web menu page, a web mail send page, a web mail search page, a web mail read page, a search engine search result page, an SAP portal authentication page, or an SAP portal menu page. The identification data may indicate that a user is authorized but not authenticated.

According to another general implementation, a system includes a server and a gateway. The server is configured to store web pages, the web pages being organized into entry pages that do not accept input, and protected pages that are not entry pages. The gateway is configured to receive a request from a user application to receive a requested web page, the request including a referrer string indicative of a referring web page, and identification data, determine whether the requested web page is an entry page or a protected page, determine, if the requested web page is determined to be a protected page, if the user application is authorized based upon the identification data, and if the referring web page is stored on the site based upon the referrer string, effectuate the transmission of the requested web page to the user application if the user application is determined to be authorized and if the referring web page is determined to be stored on the site, and redirect the request to one of the entry pages if the user application is determined to be not authorized or if the referring web page is determined to be not stored on the site.

According to another general implementation a computer program product is tangibly embodied in a machine-readable storage medium. The computer program product includes instructions that, when read by a machine, operate to cause a data processing apparatus to store web pages on a site, the web pages being organized into entry pages that do not accept input, and protected pages that are not entry pages, to receive a request from a user application to receive a requested web page, the request including a referrer string indicative of a referring web page, and identification data, and to determine whether the requested web page is an entry page or a protected page. The computer program product further includes instructions that, when read by the machine, operate to cause the data processing apparatus to determine, if the requested web page is determined to be a protected page, if the user application is authorized based upon the identification data, and if the referring web page is stored on the site based upon the referrer string, to transmit the requested web page to the user application if the user application is determined to be authorized and if the referring web page is determined to be stored on the site, and to redirect the request to one of the entry pages if the user application is determined to be not authorized or if the referring web page is determined to be not stored on the site.

The details of one or more implementations are set forth in the accompanying drawings and the description, below. Other potential features and advantages of the disclosure will be apparent from the description and drawings, and from the claims.

DESCRIPTION OF DRAWINGS

FIGS. 5 to 10 illustrate the organization of entry pages and protected pages, for various exemplary online applications.

Like reference numbers represent corresponding parts throughout.

DETAILED DESCRIPTION

Figure 1:
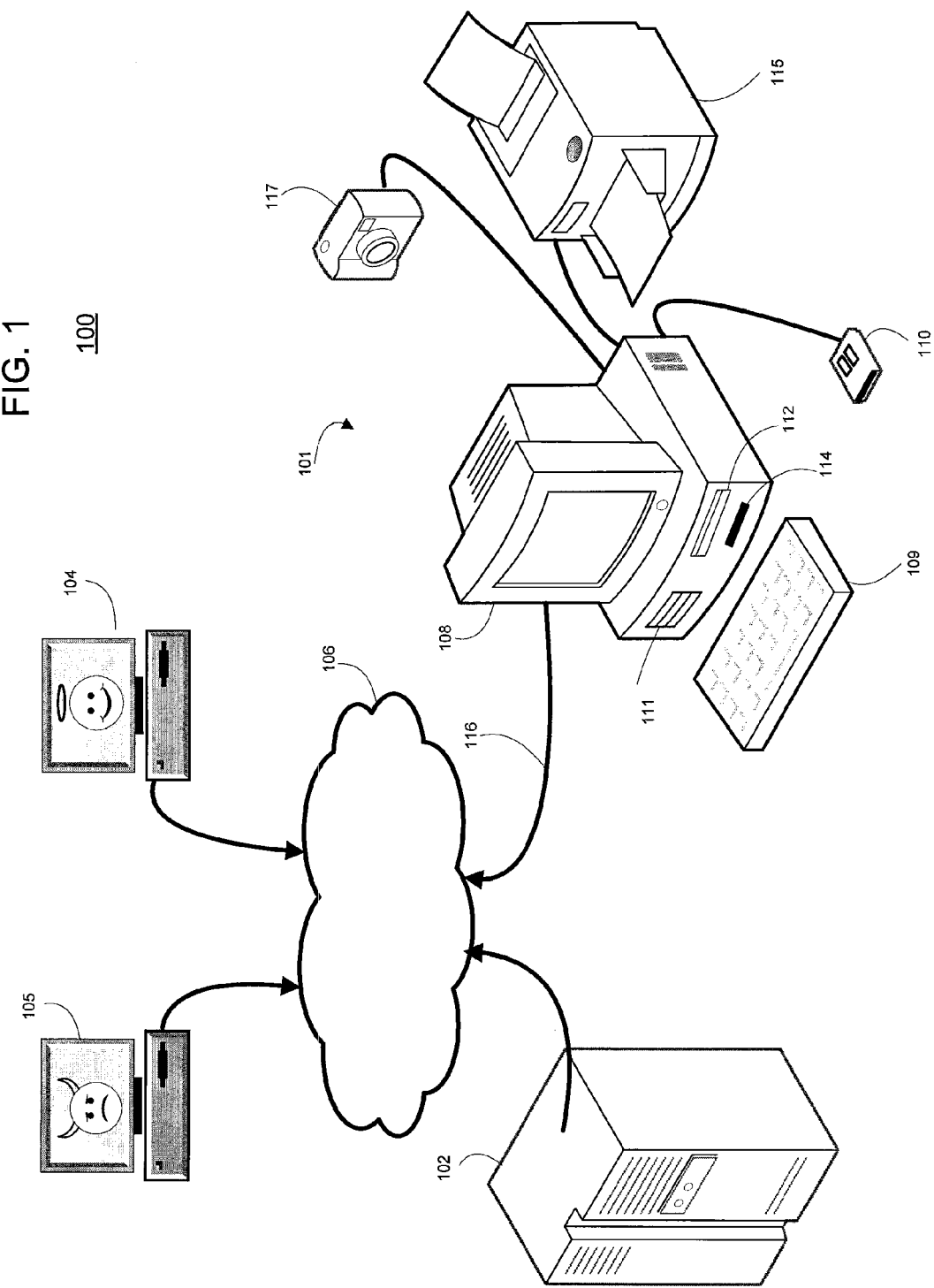
FIG. 1 depicts the exterior appearance of an exemplary system, according to one general implementation.

FIG. 1 depicts the exterior appearance of an example system 100, including a gateway computer 101, a web site 102, a computer 104 used by legitimate web user, and a computer 105 used by a hacker, all connected by way of a network 106. For the purpose of describing the enhanced cross-site attack prevention approach, below, a hacker (or "attacker") is a user or user application whose purpose is, among other things, to initiate a cross-site attack, either via their own actions or via the intervening actions of an innocent third party. A legitimate web user or user application, however, has no intention of initiating a cross-site attack, although their actions may unknowingly or even recklessly cause such an attack to occur. For example, a hacker is a person or program that sends a malicious link including cross-site attack scripting input to one or more legitimate web users, knowing that it is likely that a legitimate web user will select the malicious link that launches a cross-site attack. A recipient of the malicious link who selects the malicious link without knowing that the link will initiate a cross-site attack is considered a legitimate web user, even though the legitimate web user may be aware that selecting links of unknown or non-trusted origin is generally a bad practice.

Briefly, the web site 102 is configured to store web pages, the web pages being organized into entry pages that do not accept input, and protected pages that are not entry pages. The computer 104 used by the legitimate web user is configured to transmit a request from a user application to receive a requested web page, the request including a referrer string indicative of a referring web page, and identification data. The gateway computer 101 is configured to receive the request, determine whether the requested web page is an entry page or a protected page, and determine, if the requested web page is determined to be a protected page, if the user application is authorized based upon the identification data, and if the referring web page is stored on the web site 102 based upon the referrer string. The gateway computer 101 is further configured to effectuate the transmission of the requested web page to the user application if the user application is determined to be authorized and if the referring web page is determined to be stored on the web site 102, and redirect the request to one of the entry pages if the user application is determined to be not authorized or if the referring web page is determined to be not stored on the web site 102.

In more detail, the hardware environment of the gateway computer 101 includes a display monitor 108 for displaying text and images to a user, a keyboard 109 for entering text data and user commands into the gateway computer 101, a mouse 110 for pointing, selecting and manipulating objects displayed on the display monitor 108, a fixed disk drive 111, a removable disk drive 112, a tape drive 114, a hardcopy output device 115, a computer network connection 116, and a digital input device 117.

The display monitor 108 displays the graphics, images, and text that comprise the user interface for the software applications used by the gateway computer 101, as well as the operating system programs necessary to operate the gateway computer 101. A user uses the keyboard 109 to enter commands and data to operate and control the computer operating system programs as well as the application programs. The user uses the mouse 110 to select and manipulate graphics and text objects displayed on the display monitor 108 as part of the interaction with and control of the gateway computer 101 and applications running on the gateway computer 101. The mouse 110 is any type of pointing device, and may be a joystick, a trackball, a touch-pad, or other pointing device. Furthermore, the digital input device 117 allows the gateway computer 101 to capture digital images, and may be a scanner, a digital camera, a digital video camera, or other digital input device. Software used to provide for efficient cross-site attack prevention is stored locally on computer readable memory media, such as the fixed disk drive 111.

In a further implementation, the fixed disk drive 111 itself may include a number of physical drive units, such as a redundant array of independent disks ("RAID"), or may be a disk drive farm or a disk array that is physically located in a separate computing unit. Such computer readable memory media allow the gateway computer 101 to access computer-executable process steps, application programs and the like, stored on removable and non-removable memory media.

The wireless or wireline computer network connection 116 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 106 may be one or more of a LAN network, a corporate or government WAN network, the Internet, or other network. The gateway computer 101 is directly or indirectly coupled to the web site 102, the computer 104 used by the legitimate web user, and/or the computer 105 used by the hacker, so as to effectuate unidirectional or bidirectional transmission of data between the gateway computer 101, the web site 102, and/or the computers 104 and 105.

The computer network connection 116 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 112 is a removable storage device that is used to off-load data from the gateway computer 101 or upload data onto the gateway computer 101. The removable disk drive 112 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD–R" or "DVD+R"), DVD-Rewritable ("DVD–RW" or "DVD+RW"), or DVD-RAM. Operating system programs, applications, and various data files, are stored on disks, which are stored on the fixed disk drive 111 or on removable media for the removable disk drive 112.

The tape drive 114 is a tape storage device that is used to off-load data from the gateway computer 101 or to upload data onto the gateway computer 101. The tape drive 114 may be a quarter-inch cartridge ("QIC"), 4 mm digital audio tape ("DAT"), 8 mm digital linear tape ("DLT") drive, or other type of tape.

The hardcopy output device 115 provides an output function for the operating system programs and applications. The hardcopy output device 115 may be a printer or any output device that produces tangible output objects, including textural or image data or graphical representations of textual or image data. While the hardcopy output device 115 is depicted as being directly connected to the gateway computer 101, it need not be. For instance, the hardcopy output device 115 may be connected to computer 101 via a network interface, such as a wireline or wireless network.

The web site 102 exists remotely on the network 106, and includes one or more networked data server devices or servers. The web side 102 executes software which services requests sent by the gateway computer 101, where the web site 102 may include a server farm, a storage farm, or a storage server. In an alternate implementation, the web site 102 is omitted, and the functions associated with the web site 102 are actually performed by the gateway computer 101. The web site 102 may be an online banking web site, an auction web site, an online retail web site, a web-mail web site, a search engine web site, an SAP® portal web site, or another type of web site.

Furthermore, although the gateway computer 101 is illustrated in FIG. 1 as a desktop PC, in further implementations the gateway computer 101 may be a laptop, a workstation, a midrange computer, a mainframe, an embedded system, telephone, a handheld or tablet computer, a PDA, or other type of computer.

Although further description of the components which make up the web site 102, the computer 104 used by the legitimate web user, and the computer 105 used by the hacker is omitted for the sake of brevity, it suffices to say that the hardware environments of the computer or individual networked computers which make up the web site 102, the computer 104 used by the legitimate web user, and/or the computer 105 used by the hacker are similar to that of the exemplary hardware environment described herein with regard to the gateway computer 101. In an alternate implementation, the functions of any of the gateway computer 101, the web site 102, the computer 104 used by the legitimate web user, and/or the computer 105 used by the hacker are consolidated into a single or multiple, combined hardware environments. For instance, a single public computer may be first used by a hacker, then subsequently used by a legitimate web user.

Figure 2:
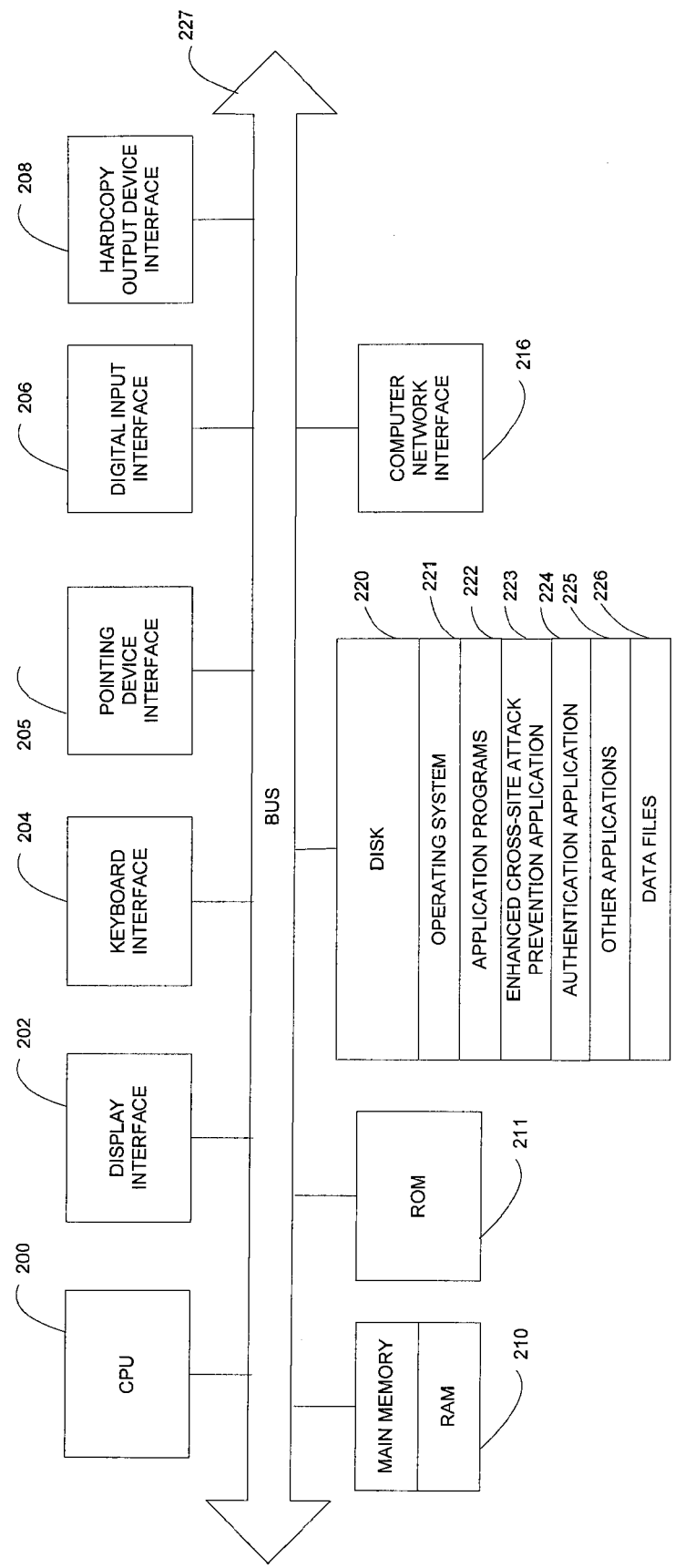
FIG. 2 depicts an exemplary internal architecture of the computer of FIG. 1.

FIG. 2 depicts an example of an internal architecture of the gateway computer 101. The computing environment includes a computer central processing unit ("CPU") 200 where the computer instructions that comprise an operating system or an application are processed; a display interface 202 which provides a communication interface and processing functions for rendering graphics, images, and texts on the display monitor 108; a keyboard interface 204 which provides a communication interface to the keyboard 109; a pointing device interface 205 which provides a communication interface to the mouse 110 or an equivalent pointing device; a digital input interface 206 which provides a communication interface to the digital input device 117; a hardcopy output device interface 208 which provides a communication interface to the hardcopy output device 115; a random access memory ("RAM") 210 where computer instructions and data are stored in a volatile memory device for processing by the computer CPU 200; a read-only memory ("ROM") 211 where invariant low-level systems code or data for basic system functions such as basic input and output ("I/O"), startup, or reception of keystrokes from the keyboard 109 are stored in a non-volatile memory device; a storage 220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 221, application programs 222 (including enhanced cross-site attack prevention application 223, authentication application 224, and other applications 225 as necessary) and data files 226 are stored; and a computer network interface 216 which provides a communications interface to the network 106 over the computer network connection 116. The constituent devices and the computer CPU 200 communicate with each other over the computer bus 227.

Briefly, the enhanced cross-site attack prevention application 223 is tangibly embodied in disk 220, a machine-readable storage medium. The enhanced cross-site attack prevention application 223 includes instructions that operate to cause a computer to store web pages on the web site 102, the web pages being organized into entry pages that do not accept input, and protected pages that are not entry pages, to receive a request from a user application to receive a requested web page, the request including a referrer string indicative of a referring web page, and identification data, and to determine whether the requested web page is an entry page or a protected page. The enhanced cross-site attack prevention application 223 further includes instructions that operate to cause a computer to determine, if the requested web page is determined to be a protected page, if the user application is authorized based upon the identification data, and if the referring web page is stored on the web site 102 based upon the referrer string, to transmit the requested web page to the user application if the user application is determined to be authorized and if the referring web page is determined to be stored on the web site 102, and to redirect the request to one of the entry pages if the user application is determined to be not authorized or if the referring web page is determined to be not stored on the web site 102.

The RAM 210 interfaces with the computer bus 227 so as to provide quick RAM storage to the computer CPU 200 during the execution of the software programs such as the operating system application programs, and device drivers. More specifically, the computer CPU 200 loads computer-executable process steps from the fixed disk drive 111 or other memory media into a field of the RAM 210 in order to execute software programs. Data is stored in the RAM 210, where the data is accessed by the computer CPU 200 during execution.

Also shown in FIG. 2, the gateway computer 101 stores computer-executable code for a operating system 221, and application programs 222 such as word processing, spreadsheet, presentation, gaming, or other applications. Although it is possible to provide for enhanced cross-site attack prevention using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 200 is one of a number of high-performance computer processors, including an INTEL® or AMD® processor, POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 200 is more than one processing unit, including a multiple CPU configuration found in high-performance workstations and servers, or a multiple scalable processing unit found in mainframes.

The operating system 221 may be MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 221 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

Although further description of the internal architecture of the web site 102 and computer 104 and 105 is omitted for the sake of brevity, it suffices to say that the architectures of those computers are substantially similar to that of the gateway computer 101. In an alternate implementation, where the functions of the gateway computer 101 and the serve 106 are combined in a single, combined hardware environment, the internal architecture is combined or duplicated.

While FIGS. 1 and 2 illustrate one possible implementation of a computing system that executes program code, or program or process steps, configured to effectuate enhanced cross-site attack prevention, other types of computers may also be used as well.

With regard to cross-site attacks, developers use the SUN MICROSYSTEMS® JAVASCRIPT® language to legitimately enhance web-based user applications by embedding scripts into HTML pages that are interpreted by a user's web browser. The execution of the scripts in a page is sandboxed by the browser, such that all accesses and references are monitored. The sandbox creates an environment in which there are strict limitations on what system resources the applet can request or access, and is used when executable code comes from unknown or non-trusted sources, reducing the risk to a user who runs non-trusted code. With regard to script execution, a same origin policy governs that a script is only allowed to access objects within the sandbox, particularly objects that originated from the same site. As is understood in the context of the same origin policy, a site refers to domain name system ("DNS") domain (e.g. www.website-.com), such that all objects from that site or domain are considered to originate from the same origin.

In the JAVASCRIPT® language object model, example objects include web pages or cookies. Since a script that can access these objects effectively has significant control over them, a hacker could, for example, rewrite a web page or read and send cookies to a different host to rewrite a money transfer to a hacker's own account or to forward a cookie that authenticates a legitimate web user to the hacker. With regard to the same origin policy, a security context is established between a user and a web site, such that scripts that execute in a particular security context can access objects in the user's web browser from that web site. In order for a script to enter this security context, the script is embedded in a web page requested from the web site.

If the hacker is able to embed a script in a web page that a legitimate web user has requested from a web site, the hacker can take control of the legitimate web user's security context.

Such a maliciously embedded script is referred to as a cross-site scripting attack, since the script may have originated from a different web site.

In order to mount a cross-site scripting attack, the hacker may exploit vulnerabilities of common web applications. For instance, since interactive web applications accept user input to build the response web page, an hacker may inset a script into the input, which may not be well checked by the particular web application. In one example, a user may submit a request to a web page using the following input:

HTTP://WWW.WEBSITE.COM/
INDEX.PHP?NAME=JIM

In response to the input, the web application may respond with the following personalized web page:

```
<HTML>
<BODY>
HELLO, JIM
...
```

A hacker, however, could request the same page using the following input:

HTTP://WWW.WEBSITE.COM/INDEX.PHP?NAME=JIM<SCRIPT>ALERT("XSS SCRIPT")</SCRIPT>

In response to this input, the same web application would generate the following:

```
<HTML>
<BODY>
HELLO, JIM
<SCRIPT>ALERT("XSS SCRIPT")</SCRIPT>
...
```

Based upon inserting text in the input portion of the URL, a response would be generated with execute a script ("XSS SCRIPT") within the legitimate web user's security context. The consequences of such a script execution could be severe, and might include cookie and session theft, browser hijacking, user monitoring and data theft, request forgery, and fake transactions. Such an attack is referred to as a reflected cross-site scripting attack, since the input is reflected by the users' browser. It is not always the case that the legitimate web user sees or interacts with the illegitimate input that is sent on their behalf either, and consequently the legitimate web user may have no chance to check this input before it is sent to the web site.

As a further enhancement of the danger of cross-site scripting attacks, the complexity of an introduced script is not necessarily limited by the length of the input. Specifically, a hacker can also introduce a reference to a different URL or page, where the web site that hosts a malicious link and the source of the script code do not need to coincide. A hacker may also present a malicious link to a legitimate web user not only via a web page, but also by way of an electronic mail message or other form of electronic communication. For example, upon receiving a spam e-mail message, a user could unknowingly select a link and request a page using the following input, from the exemplary web site described above:

HTTP://WWW.WEBSITE.COM/INDEX.PHP?NAME=JIM<SCRIPT SRC="HTTP://HACKER.NET/XSS.JS">

Such an input would result in the following response:

```
<HTML>
<BODY>
HELLO, JIM
<SCRIPT SRC="HTTP://HACKER.NET/XSS.JS">
...
```

Similar interactions may also be used in a cross-site request forgery attack, although the goals may differ. In a such an attack, the hacker exploits the existence of a session, which is a time-limited authorization for a legitimate web user to perform certain actions. While a cross-site scripting attack attempts to introduce a script into the security context of the legitimate web user, the request itself suffices for a request forgery attack, since the request might initiate a forged transaction. Using the enhanced cross-site attack prevention approach, both such attacks may be addressed. Since the input to the web application originates from a legitimate web user's web browser, cross-site attack prevention may occur by preventing the issuance of illegitimate input on behalf of that user.

Figure 3:
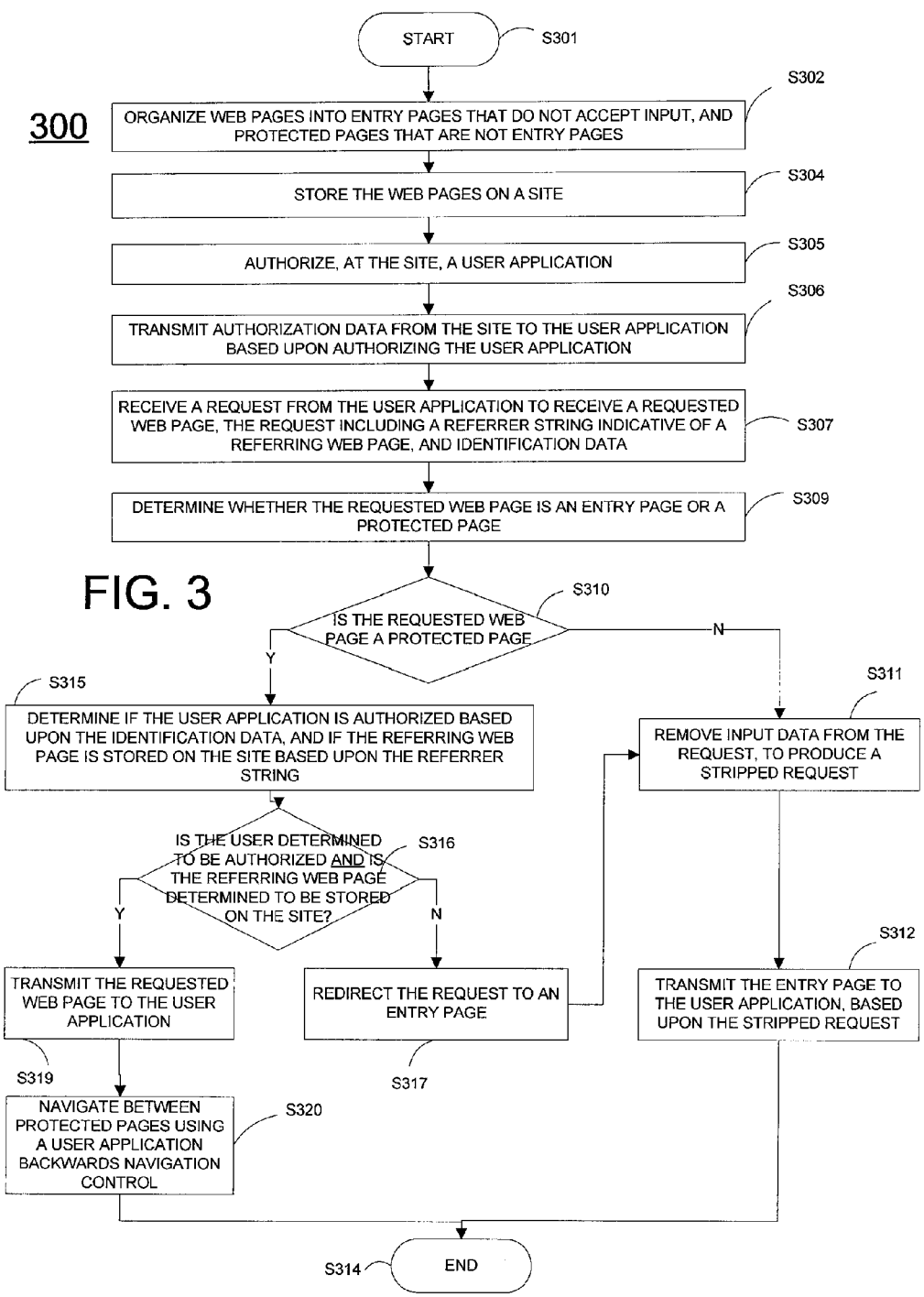
FIG. 3 is a flowchart illustrating an exemplary process for implementing enhanced cross-site attack prevention.

FIG. 3 is a flowchart illustrating a process for implementing enhanced cross-site attack prevention. Briefly, the process includes storing web pages on a site, the web pages being organized into entry pages that do not accept input, and protected pages that are not entry pages, receiving a request from a user application to receive a requested web page, the request including a referrer string indicative of a referring web page, and identification data, and determining whether the requested web page is an entry page or a protected page. The process also includes determining, if the requested web page is determined to be a protected page, if the user application is authorized based upon the identification data, and if the referring web page is stored on the site based upon the referrer string, and transmitting the requested web page to the user application if the user application is determined to be authorized and if the referring web page is determined to be stored on the site. Moreover, the process also includes redirecting the request to one of the entry pages if the user application is determined to be not authorized or if the referring web page is determined to be not stored on the site.

In more detail, process 300 being (S301) when the web pages are organized into the entry pages and the protected pages, at the site (S302), and stored on the site (S304). The entry pages do not accept input, such that input to an entry page is either filtered by a gateway or discarded, and the protected pages can accept input. Access to protected pages, which may include applications, servlets or scripts, is provided via an access path over an entry page. In the exemplary system of FIG. 1, web pages can be organized at and stored on gateway computer 101 and/or web site 102.

Visits to a web site originate (or 'enter') at an entry page before proceeding to a protected page. In this manner, input to protected pages is enforced to originate from a legitimate entry in a legitimate web user's browser, and cross-site attacks attempted by malicious links are prevented. Natural candidates for entry pages are login pages, home pages or portal fronts, and other pages to which bookmarks are typically set.

Protected (or 'regular') pages are those pages that are not entry pages. The protected pages can, but do not have to accept input, and can be pages that do not accept input. Example protected pages may be an online banking transaction page, an online banking menu page, an online banking authentication page, an online auction search results page, an online auction login page, an online auction authentication page, an online auction bid entry page, an online auction bid verification page, an online retailer search results page, an online retailer shopping cart page, an online retailer login page, an online retailer credit card address verification page, an online retailer confirmation page, a web mail authentication page, a web menu page, a web mail send page, a web mail search page, a web mail read page, a search engine search result page, an SAP® portal authentication page, an SAP® portal menu page, or other pages.

Organization of web pages on a site into entry pages or protected pages may occur manually, such as by a programmer or administrator, or automatically. For example, pages which do not accept input may be automatically classified an entry pages, while all other pages, or pages which do accept input, may be automatically classified as protected pages. In one specific example, web pages stored on web site 102 are automatically organized into entry pages and protected pages by a classification application stored on the gateway computer 101.

Figure 4:
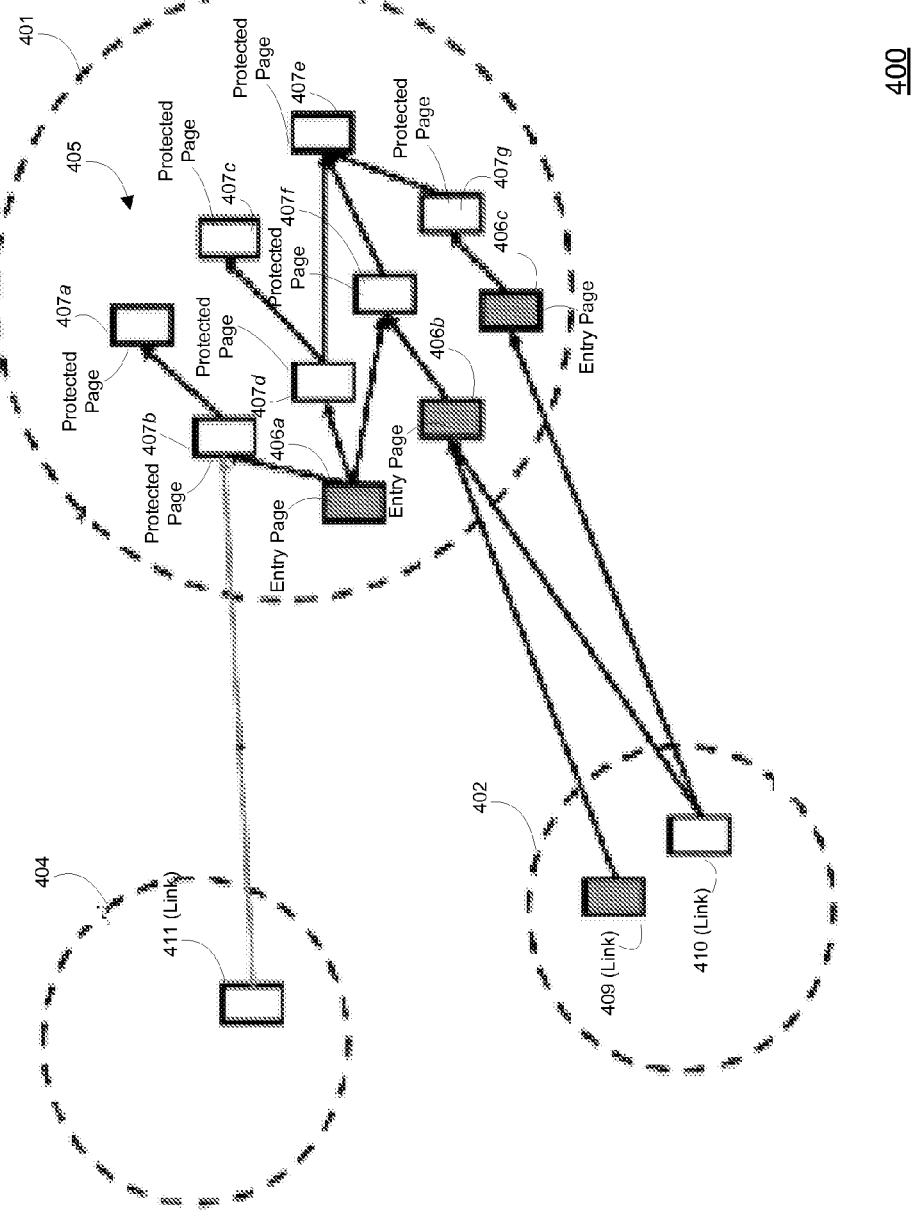
FIG. 4 illustrates an exemplary system, including a target web site, and respective computers associated with a legitimate web user and a hacker.

Referring ahead briefly, FIG. 4 illustrates an exemplary system 400, including a target web site 401, a computer 402 used by a legitimate web user, and a computer 404 used by a hacker. The target web site 401 sorts web pages 405 organized into entry pages 406a to 406c that do not accept input, and protected pages 407a to 407g. The computer 402 used by the legitimate web user stores a bookmark link 409 to the entry page 406b. Although the bookmark link 410 stored on the computer 402 is ostensibly linked to a protected page, the link is redirected to entry page 406b or 406c, since direct entry or bookmarking is not allowed to protected pages. The computer 404 used by the hacker stores a link 411 to protected page 407b, with malicious cross-site scripting input.

Returning to FIG. 3, the user application may be authorized, at the site (S305). Authorization may occur by uniquely identifying the user application, such via a unique name or address of the user application, and recognizing or permitting further requests matching the unique identifier. Authorization may further include authentication to establish the authorship or origin of the user application, perhaps based upon the unique identifier, which may occur by constructing an identification cookie based upon a message authorization code with the user name and a secret key that is known to the web site. Alternatively, authentication may occur using a secret key, using a session URL, using HTTP authentication, or user application-side secure sockets layer ("SSL").

HTTP authentication allows web browser or other user application to provide credentials in the form of a user identifier and password when making a request. These credentials may be passed as plaintext, or they may be encrypted. The user application may be, for example, a web browser application executed on a user device. Using HTTP authentication, the user application requests a page that requires authentication, but does not provide a user name and password, such as by entering an address or followed a link to the page. The server responds with the '401' response code to provide the authentication realm, and the client will present the authentication realm to the user and prompt for a user name and password, at which time the user may decide to forgo authentication. Once a user name and password have been supplied, the client re-sends the same request but includes the authentication header, and the server accepts the authentication and the page is returned. If the user name is invalid or the password incorrect, the server returns the '401' response code, and the user application prompts the user again.

Alternatively, SSLs are cryptographic protocols that provide secure access for user applications to communicate across a network. SSL works by initially negotiating for algorithm support by the user application, exchanging a public-key encryption-based key and certificate-based authentication, and performing symmetric cipher-based traffic encryption.

Although these and other approaches are available, authorization is described herein using cookies due to their popularity in many real-world applications and portals. In one example implementation, a cookie is generated when the user enters a user name and a password, such that the cookie is electronically associated with the user's identity. A cookie can be issued by the web site after the user completes an authentication protocol, such as a password check.

A "non-authenticated" cookie can alternatively be generated and transmitted to a user application without fully authenticating the user application, indicating that the user application is authorized to traverse protected pages, but is not yet authenticated. In this regard, a web site may be organized to generate a non-authenticated cookie at a portal entry page to allow access to and to track a user across certain protected pages, then subsequently provide an authorization page after other protected pages have been viewed, to effectuate full authentication of the user application.

Data, such as the cookie or password, may be transmitted from the site to the user application based upon authorizing the user application (S306). This data may be identification data, which is data that is expected to be transmitted from the user application back to the gateway with a web site request, or the data may be authorization data, which is data that is processed by the user application to generate identification data. In another example implementation, no data is transmitted from the site to the user application. In the exemplary system of FIG. 1, identification or authorization data is transmitted from the gateway computer 101 to the computer 104 used by the legitimate web user.

The identification data can be a cookie, which is a small piece of data used to authenticate a user operating the user application that the web browser retransmit back to the web site with a request for a web page, where the cookie is modifiable by the web site. Alternatively, the authorization data may be data which allows the user application to generate a cookie at the client device, where the generated cookie is transmitted back to the web site as identification data. Cookies are stored on the user's computer and, as dictated by the same origin policy, are associated with the web site such that a web site receives its associated cookies associated from a user. A web site may be associated with more than one cookie.

A request is received from a user application to receive a requested web page, the request including a referer string indicative of a referring web page, and identification data (S307). The request may be received at a gateway, such as gateway computer 101, or at the web site, such as web site 102.

The referrer string may be a HTTP referer string, and may store a URL of the referring web page. The HTTP referer string is an HTTP header field in the request that contains the URL of the web page referring to the requested page. A web site developer can request the user to enable referrer strings in a user application, since the absence of a referrer string can be detected and used to redirect a user application to a page advising the user to enable referrer strings.

It is determined whether the requested web page is an entry page or a protected page (S309). Such a determination may be made by consulting a table stored on the gateway computer 101 or the web site 102 which classifies web pages as entry pages or protected pages. Alternatively, the metadata within requested web page itself can be checked to determine if the web page is identified as an entry page or a protected page. If the organization of web pages into entry pages and protected pages is performed automatically, a similar determination could also be automatically made based upon the same classification criteria. For example, if web pages are automatically classified as protected pages if they accept input, the gateway computer 101 could determine whether a requested web page is a protected page by determining whether the requested page accepts input.

If it is determined that the requested page is not a protected page (S310), input data may be removed from the request to thereby produce a stripped request (S311). For each access to an entry page, input in the form of query URLs or POST request data is stripped, where the entry page is transmitted to the user application based upon the stripped request (S312), thereby ending the process 300.

Other input data, such as HEAD, GET, PUT, DELETE, TRACE, OPTIONS, CONNECT or other request data may also be stripped. In the FIG. 4 example, assuming the computer 402 is authorized, if the link 409 to entry page 406b is selected on the computer 402 used by the legitimate web user, all input is stripped from the link, and the entry page 406b is transmitted to the associated user application. In an alternate implementation, the input data is not removed from the request.

If it is determined that the requested page is a protected page (S310), it is further determined if the user application is authorized based upon the identification data, and if the referring web page is stored on the site based upon the referrer string (S315). In this regard, for each access to a protected page, the gateway verifies that a cookie has been set that authenticates a user and that the referrer string of the request originates from the web site. The cookie may be a "non-authenticated" cookie.

An example set of HTTP headers for a reflected cross-site scripting attack, and an enhanced response are shown below:

browser correctly authenticates the user. If the request has the identification cookie and contains an appropriate referrer string, however, the request is not a cross-site attack, and access to the protected page is allowed.

If the user is determined to be not authorized and/or the referring web page is determined to be not stored on the site (S316), the request is redirected to one of the entry pages (S317). In other example implementations, the request is redirected to a default entry page, or is not redirected.

In the exemplary system 400 of FIG. 4, although the computer 402 is assumed to be authorized, if the link 410 to a protected page is selected on the computer 402 used by the legitimate web user, the request is redirected to one of the entry pages 406b or 406c. Also, since the computer 404 used by the hacker is not authorized, if the link 410 to the protected page 407b is inadvertently selected by the legitimate web user, the request is redirected to an entry page.

Returning to FIG. 3, if the user is determined to be authorized and the referring web page is determined to be stored on the site (S316), the requested web page is transmitted to the user application (S319). By determining that the user is authorized and that the referring web page is stored on the site, the risk that a cross-site attack has been initiated is reduced. Navigation between protected pages may then occur using a user application backwards navigation control (S320), and process 300 ends (S314). In alternate implementations, navigation between protected pages occurs without using user application navigation controls, or navigation using user application navigation controls is disabled.

The enhanced cross-site prevention approach described by process 300 may be used to augment input filtering as a part of an overall software strategy, for example to disallow inappropriate input caused by flaws in an input filtering algorithm. Use of this approach bolsters the protection provided by filtering algorithms, since filtering algorithm exploits spread very quickly using worms, and since filtering algorithms are often shared via libraries. The discovery of vulnerabilities caused by the underlying libraries exposes numerous web sites at the same time, and is not completely remedied until all web sites individually update their code.

Notably, the enhanced cross-site attack prevention approach does not merely disallow scripts that exist on the web site, disable scripts which are detected to include malicious characters, prevent scripts from leaking data to a hacker, rewrite requests or responses by adding tokens to a URL, or prevent successful scripting attacks from stealing a session.

```
GET/PROTECTED_PAGE.PHP?NAME=<SCRIPT>ALERT(%22XSS%22)
    <%2FSCRIPT> HTTP/1.1
HOST: WWW.WEBSITE.COM
REFERER: HTTP://WWW.HACKER.NET/
MALICOUS_LINK.HTML
COOKIE: AUTH=USERNAME: 9100ADA74E758C76D0CCB2595747C910
HTTP/1.1 302 FOUND
LOCATION: HTTP://WWW.WEBSITE.COM/
DEFAULT_ENTRY.HTML
```

In this example, a user may have inadvertently selected a malicious link requesting a sensitive protected page on the web site, with input supplied by the hacker. The gateway computer 101 or the web site 102 detects that the referrer string does not originate at the web site, and redirects the request to the default entry page. Redirection occurs even though the cookie that has been automatically sent by the web As such, the enhanced cross-site attack prevention approach reduces costs associated with both setting up a system and addressing each request, since a hypertext preprocessor ("PHP") wrapper and proxy are not required, and since it is not necessary to map requests to DNS entries. In doing so, replication and load balancing issues are alleviated.

A gateway, such as gateway computer 101, can be deployed in front of a user application written in any language, including load balanced applications. Verification of a cookie at the gateway can be effectuated by formatting the cookie, as shown below:

$$\text{USERNAME} | \text{MAC}(\text{USERNAME}, \text{KEY})$$

When formatted in this or a similar manner, the gateway can use the key to verify the cookie and the user's identity with one message authentication code computation, without rewriting the output, since this output of the web application is merely forwarded. Rewriting, and the corresponding delay, can be thus avoided for each request.

Figure 5:
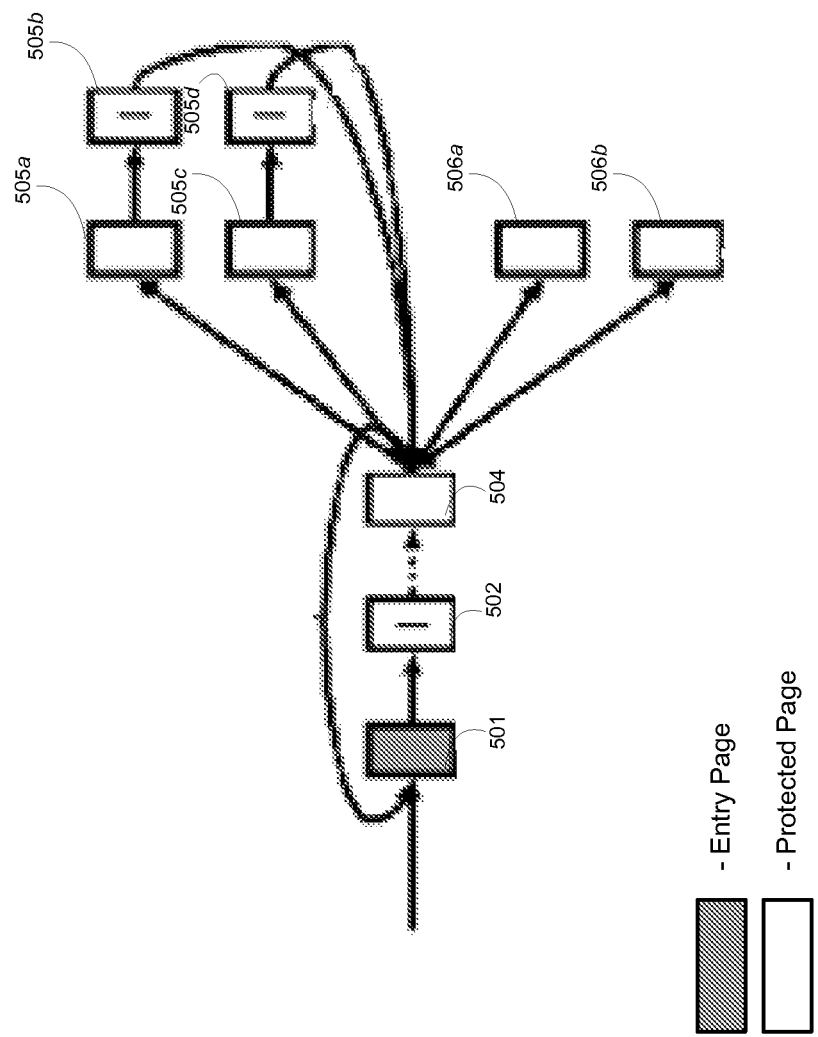

FIG. 5 illustrates the organization of an entry page and protected pages, for an exemplary online banking application 500. Briefly, the online banking application 500 includes a single entry page and multiple protected pages that are accessed via the entry page.

In more detail, homepage entry page 501 provides a form for logging into the online banking application 500. The user application does not need to present a cookie or provide any other authorization or identification data to access the home page entry page 501. After traversing the homepage entry page, the online banking application 500 authenticates the user application via an input-accepting authentication protected page 502. For example, input-accepting authenticating protected page 502 may verify a supplied username and password.

Upon authentication, the user application is redirected to a main menu protected page 504, which provides for a selection of options by the user. Options provided by the main menu protected page 504 link the user application to transaction protected pages 505a to 505d, which may accept input. These transactions may include, for example, money transfers or stock market orders, and confirmation pages. Although a single transaction may include more than one step or page, the protected nature of these individual pages persists. Options may also link the user application to menu protected pages 506a and 506b, which may also accept input. By manual selection or automatic redirection, a user application may be redirected to the homepage entry page 501 from any of the protected pages.

Figure 6:
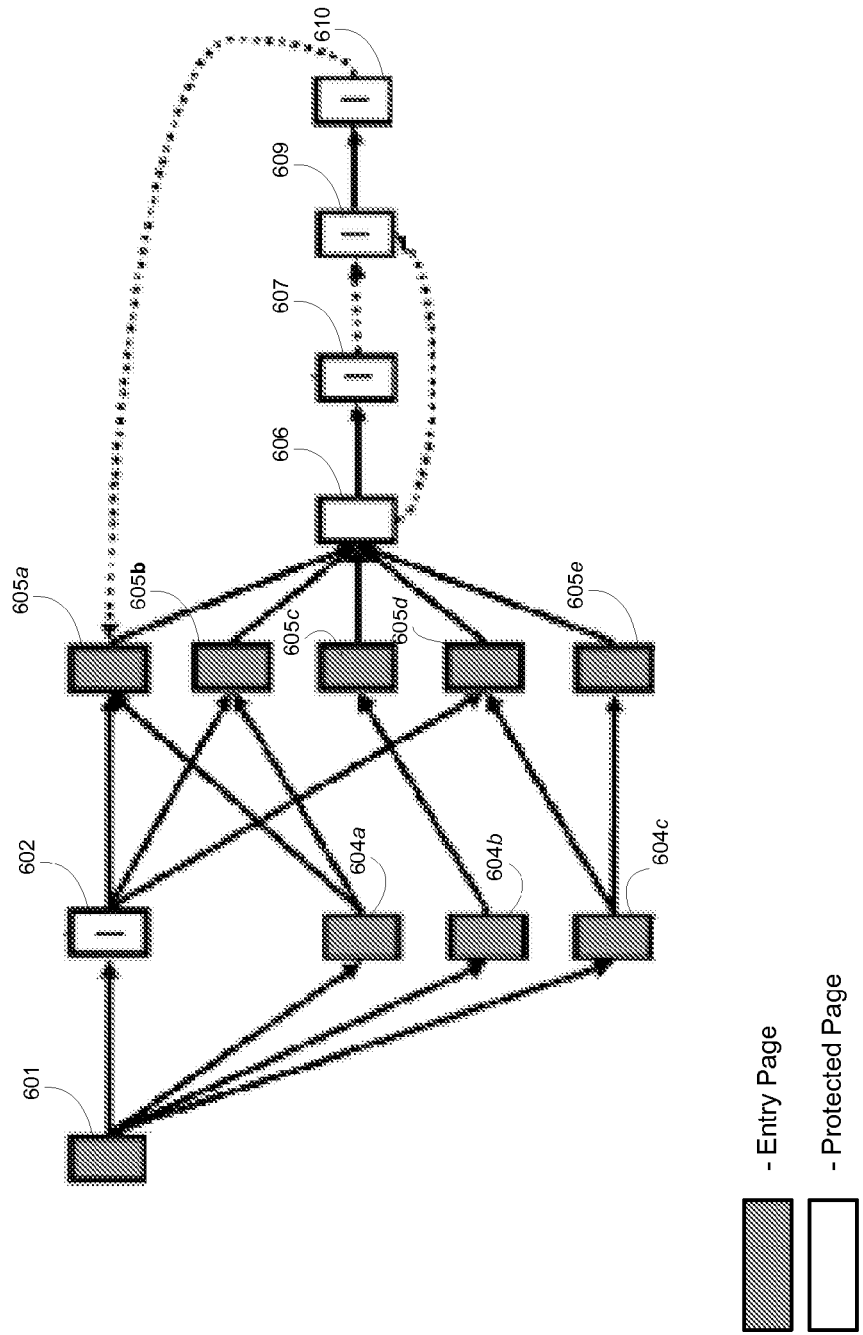

FIG. 6 illustrates the organization of entry pages and protected pages, for an exemplary online auction application 600. Briefly, the online auction application 600 includes multiple entry pages and protected pages for effectuating browsing, searching, and bidding. Like the online banking application 500, a homepage entry page 601 provides a form for logging into the online auction application 600. Since the homepage entry page 601 is an entry page, the user does not need to present a cookie or provide any other authentication or identification data to access this page.

After successfully identifying the user and entering search terms at the homepage entry page 601, an input-accepting search results protected page 602 is viewed to display the search results summary. Since the search results protected page 602 is a protected page, it cannot be directly accessed without visiting an entry page, such as the homepage entry page 601. The search results protected page 602 can also be accessed without authenticating first, through the use of a "non-authenticated cookie" that is provided by the entry pages to identify a non-authenticated user.

Categories of items may be browsed without authenticating the user, via category browsing entry pages 604a to 604c. Like other entry pages, the homepage entry page 601 and the category browsing entry pages 604a to 604c may be bookmarked. From the input-accepting search results protected page 602 or the category browsing entry pages 604a to 604c, auctioned items are viewed on item entry pages 605a to 605e.

Since the item entry pages 605a to 605e are organized as entry pages, they are capable of being bookmarked, searched by search engines, forwarded to others, and accessed directly without first visiting another page stored on the site. Furthermore, the item entry pages 605a to 605e are not required to be static, and can include variable portions to display the highest bid amount, or auction time remaining.

Upon selecting an item via an item entry page 605, a login protected page 606 and a input-accepting authentication protected page 607 are provided if the user has not yet been authenticated. Once authenticated, an input-accepting bid entry protected page 609 and an input-accepting bid verification protected page 610 are provided to receive bids. Direct access to the login protected page 606, the authentication protected page 607, the bid entry protected page 609 and the bid verification protected page 610 is not allowed without first accessing an entry page.

After bid verification, the user application is redirected to an item entry page 605. In order to identify an item under consideration, the respective pages involved in the bidding process receive an item identifier as input. If protected pages are configured to use the non-identification cookie, authentication for different pages can be effectuated by the gateway.

Figure 7:
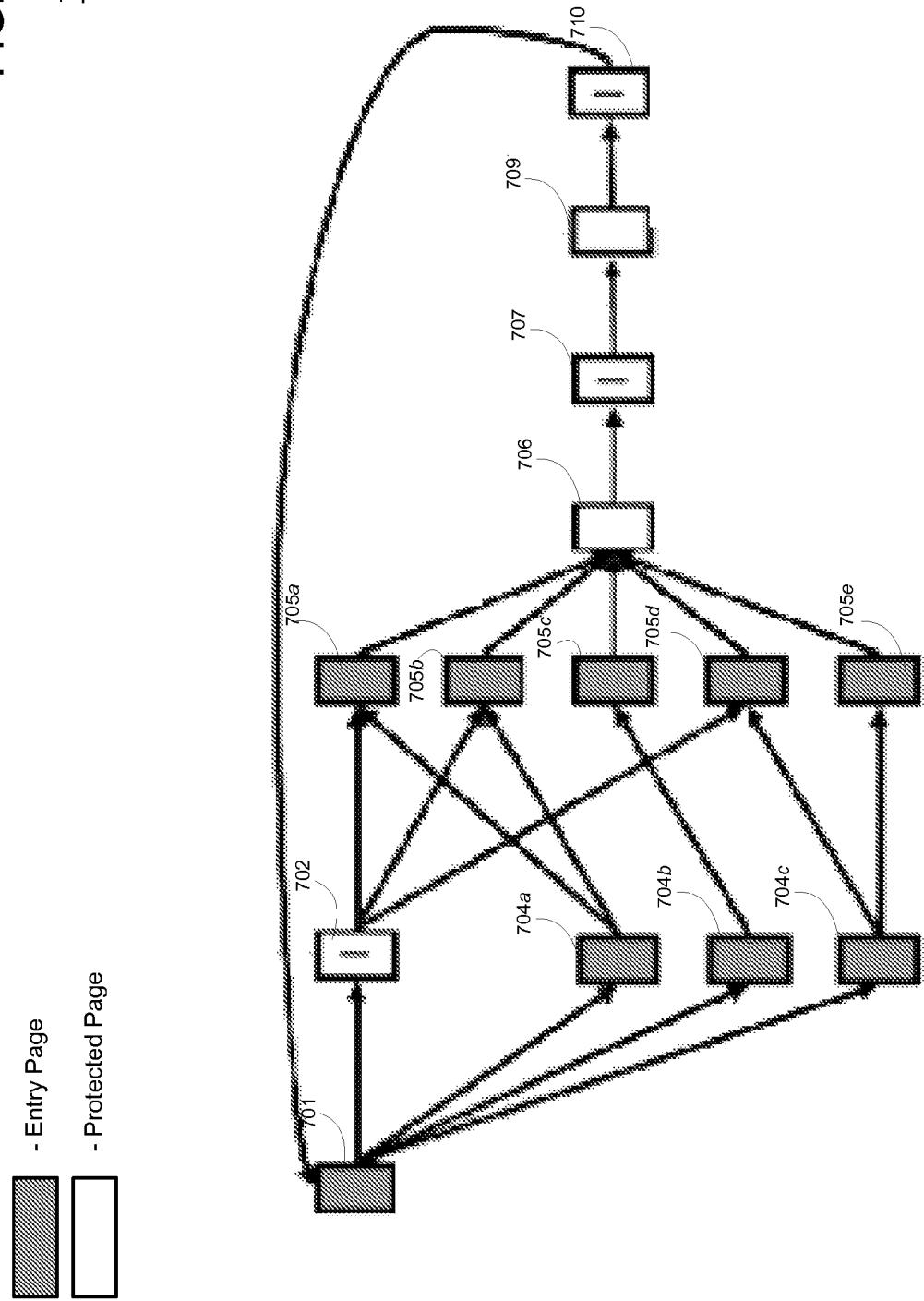

FIG. 7 illustrates the organization of entry pages and protected pages, for an exemplary online retail application 700. Similar to the online auction application 600, the online retail application 700 also includes an homepage entry page 701, an input-accepting search results protected page 702, category browsing entry pages 704a to 704c, and item entry pages 705a to 705e. Through the use of a non-authenticated cookie, a user may be identified and authorized to view the search results protected page 702 and a shopping cart protected page 706 without full authentication. Upon progressing to the checkout procedure, a shopping cart protected page 706 and an input-accepting login protected page 707 enforce authentication of the user. A payment protected page 709 and a confirmation protected page 710 are similar to bidding protected pages, although further steps may be involved in an online retail context.

Figure 8:
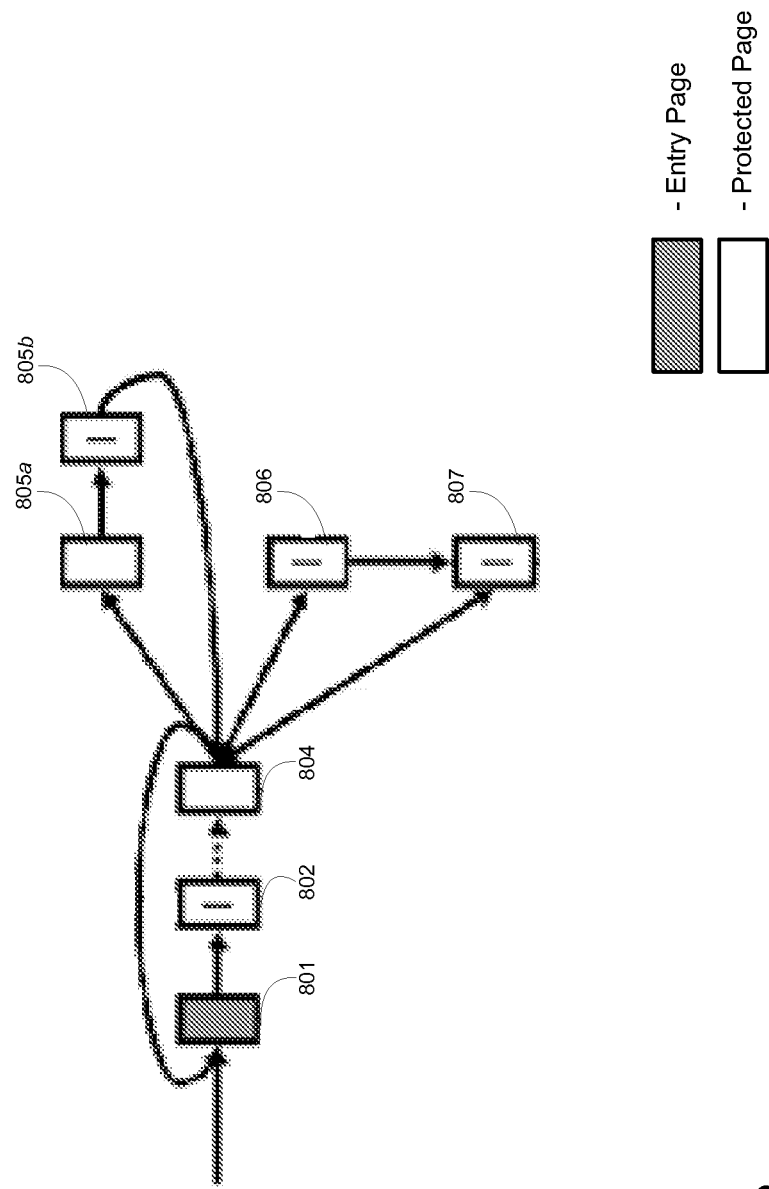

FIG. 8 illustrates the organization of entry pages and protected pages, for an exemplary webmail application 800. The webmail application 800 offers sending, reading and searching of electronic mail messages, including messages with HTML content that may include malicious scripts. Briefly, and similar to the online banking application 500, the webmail application 800 includes a single entry page and multiple protected pages that are accessed via the entry page.

In more detail, a homepage entry page 801 provides a form for logging into the webmail application 800. The user application does not need to present a cookie or provide any other authentication or identification data to access the homepage entry page 801. After successfully authenticating the user via an input-accepting authentication page 802, the webmail application 800 redirects the user application to a main menu protected page 804, which provides for the selection of options by the user. Based upon the selected option, the user application may be further directed to a mail send protected pages 805a and 805b, which may accept input, an input-accepting mail search protected page 806, an input-accepting mail read protected page 807, or other pages.

FIG. 9 illustrates the organization of an entry page and a protected page, for an exemplary search engine application 900. Briefly, the search engine application 900 includes an input-accepting homepage entry page 901 with input form, and an input-accepting search result protected page 902. Although search engine application 900 may not present a threat by itself, it is nevertheless an important target to a hacker since users often start their Internet browsing sessions on such a page. In this regard, search engine application 900 may be a tempting target for a hacker to place a malicious script.

Since the search result protected page 902 is protected, the search engine application 900 does not allow bookmark searches, or direct links queries. In one implementation, search engine application 900 uniquely identifies and authorizes, but does not authenticate users, thereby prohibiting direct access to the search result protected page 902 through the use of a non-authenticated cookie.

Figure 10:
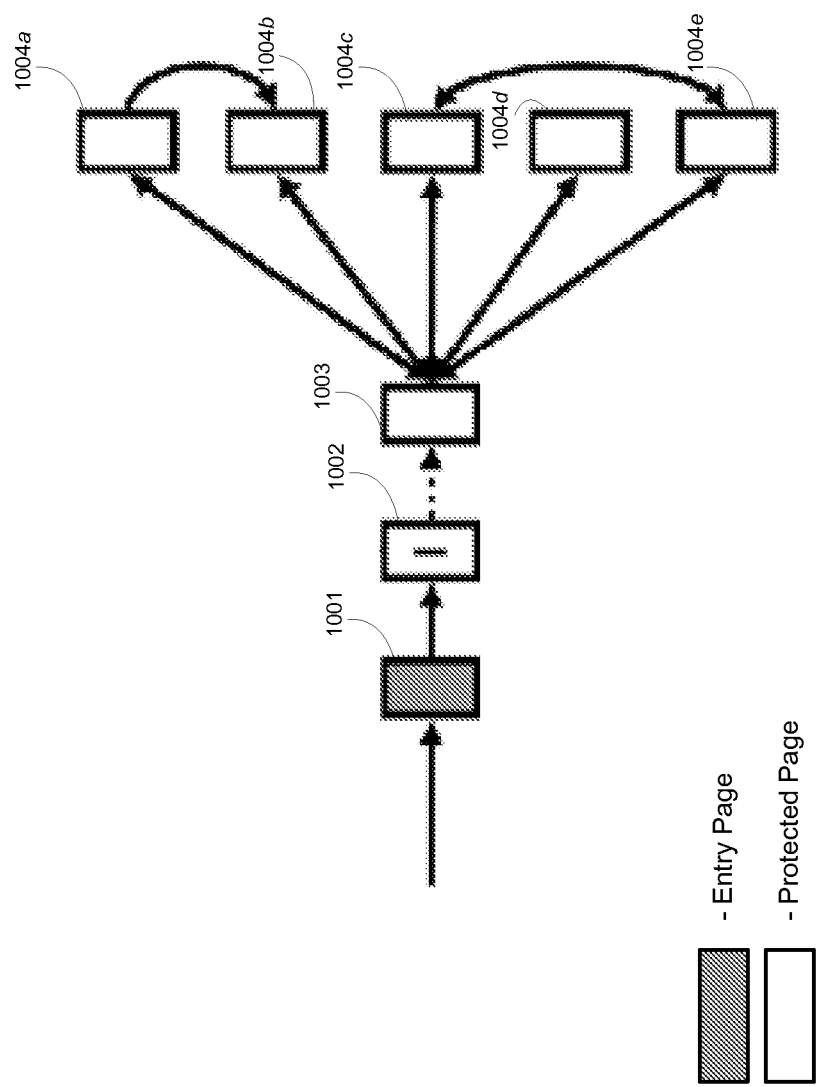

FIG. 10 illustrates the organization of an entry page and a protected page, for an exemplary SAP® portal application 1000. Briefly, the SAP® portal application 1000 includes a portal front entry page 1001, and protected pages. Access to the protected pages is effectuated via input-accepting authentication protected page 1002, which is itself accessed via the portal front entry page 1001. In one example implementation, authentication is performed using client-side SSL certificates. Once authentication has occurred, other input-accepting and non-input-accepting protected pages 1004*a* to 1004*e* are accessed via a protected main menu page 1003. Notably, the user application remains authenticated during navigation between protected pages.

Figure 11:
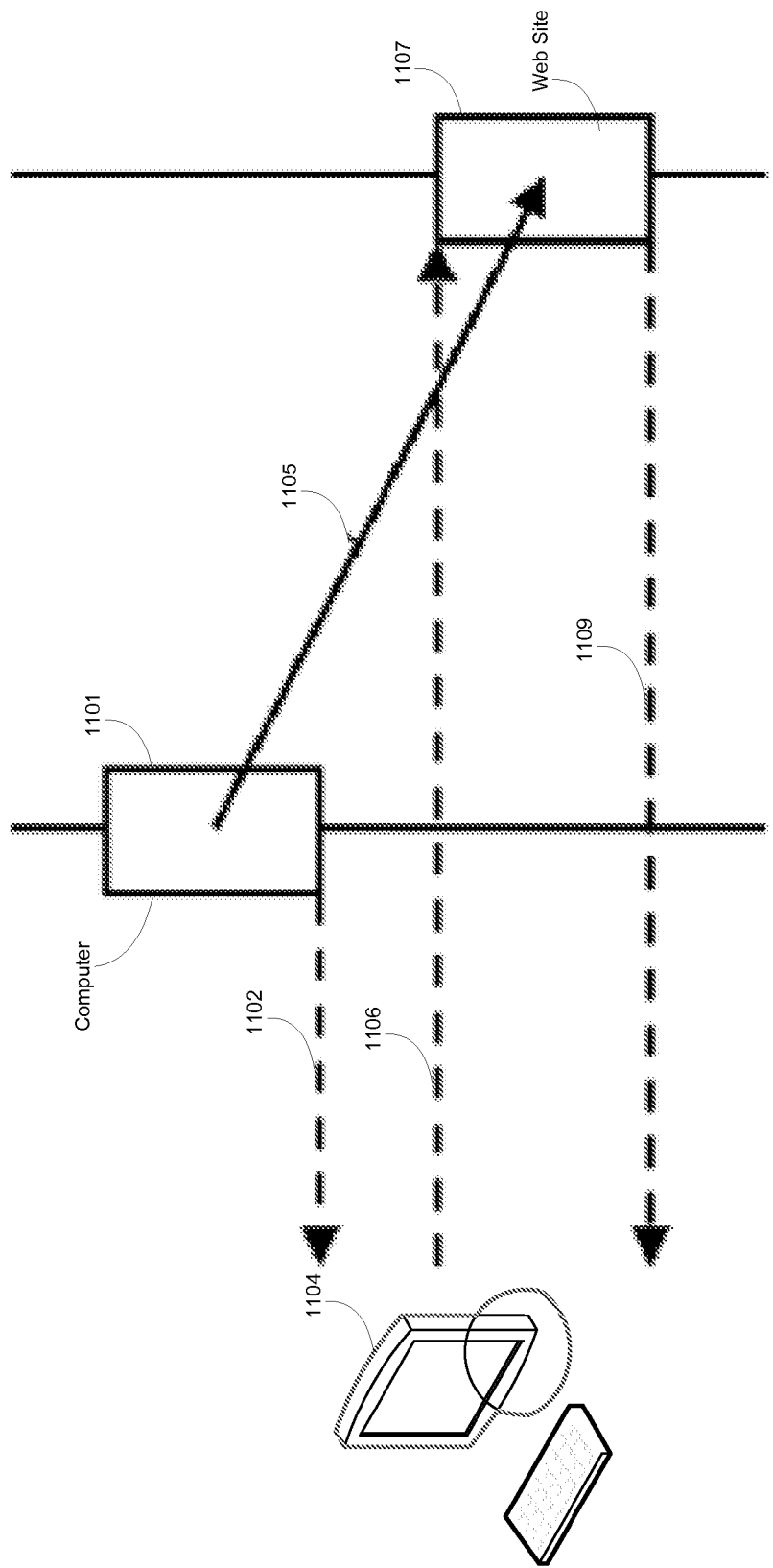
FIG. 11 is a swim diagram illustrating the prevention of a cross-site scripting attack using the exemplary process described in FIG. 3.

FIG. 11 is a swim diagram illustrating the prevention of a cross-site scripting attack using the exemplary process depicted in FIG. 3. A computer 1101 belonging to a hacker sends an electronic message 1102 to a computer 1104 used by the legitimate web user, the electronic message 1102 containing a malicious link 1105 with cross-site scripting input. Unaware of the malicious link 1105, the legitimate user may select the link 1105, which sends a request 1106 to a targeted web site 1107.

Although the legitimate user may be authorized by and authenticated with the targeted web site 1107, since the referrer string of the referring web page of the request 1106 is stored on the computer 1101 belonging to the hacker and not stored on the targeted web site 1107, a response 1109 is generated which redirects the legitimate user to an entry page, preempting the reflection of cross-site scripting content. Thus, the enhanced cross-site attack prevention approach can be used to thwart both cross-site scripting and cross-site request forgery attacks.

The enhanced cross-site attack prevention approach can be deployed in front of a web application, to process requests, to comprehensively protect the web site against cross-site attacks. Since response rewriting is not performed, this scalable approach provides an effective solution to preventing cross-site attacks, while providing for expedient deployment.

A number of implementations have been described. Nevertheless, it will be understood that various modifications may be made without departing from the spirit and scope of the disclosure. Accordingly, other implementations are within the scope of the following claims.

What is claimed is:

1. A method comprising:
storing web pages on a site, the web pages being classified, based on defined criteria, as entry pages that do not accept any input data included in received web page requests from user applications, or protected pages that are not entry pages, wherein the web pages are organized such that access to each of the protected pages is provided via an access path over one of the entry pages;
receiving a first web page request from a user application to receive a first requested web page stored on the site, the first web page request including a referrer string indicative of a referring web page, and identification data;
determining whether the first requested web page is one of the entry pages or one of the protected pages;
in response to determining that the first requested web page is one of the entry pages, removing all input data from the first web page request to produce a stripped first web page request;
in response to determining that the first requested web page is one of the protected pages, determining whether the user application is authorized to access the protected page based upon the identification data, and whether the referring web page is stored on the site based upon the referrer string;
in response to determining that the user application is not authorized to access the protected page or that the referring web page is not stored on the site, removing all input data from the first web page request to produce the stripped first web page request; and
transmitting one of the entry pages specified in the stripped first web page request to the user application.

2. The method of claim 1, further comprising:
authorizing, at the site, the user application.

3. The method of claim 2, wherein authorizing the user application further comprises authenticating the user application.

4. The method of claim 3, wherein the user application is authorized using a secret key, using a session uniform resource locator ("URL"), using Hypertext Transfer Protocol ("HTTP") authentication, or user application-side secure sockets layer ("SSL").

5. The method of claim 2, further comprising:
transmitting the identification data from the site to the user application based upon authorizing the user application.

6. The method of claim 1, wherein the protected pages further comprise applications, servlets, or scripts.

7. The method of claim 1, wherein the user application is a web browser application.

8. The method of claim 1, wherein the user application is executed on a user device.

9. The method of claim 1, wherein the referrer string is a Hypertext Transfer Protocol ("HTTP") referrer string.

10. The method of claim 1, wherein the referrer string stores a uniform resource locator ("URL") of the referring web page.

11. The method of claim 1, wherein at least one of the entry pages is a login page, a home page, or a portal front page.

12. The method of claim 1, wherein the protected page is an online banking transaction page, an online banking menu page, an online banking authentication page, an online auction search results page, an online auction login page, an online auction authentication page, an online auction bid entry page, an online auction bid verification page, an online retailer search results page, an online retailer shopping cart page, an online retailer login page, an online retailer credit card address verification page, an online retailer confirmation page, a web mail authentication page, a web menu page, a web mail send page, a web mail search page, a web mail read page, a search engine search result page, a portal authentication page, or a portal menu page.

13. The method of claim 1, wherein the defined criteria comprises:
classifying all web pages on the site that do not accept any input data included in received web page requests from user applications as entry pages; and
classifying all other web pages on the site as protected pages.

14. The method of claim 1, wherein the defined criteria comprises:

classifying all web pages on the site that accept input data included in received web page requests from user applications as protected pages; and classifying all other web pages on the site as entry pages.

15. The method of claim 1, further comprising:

receiving a second web page request to receive a second requested web page, the second web page request including a referrer string indicative of a referring web page, and identification data;

determining that the second requested web page is a protected page;

in response to determining that the second requested web page is a protected page, determining whether the user application is authorized based upon the identification data, and whether the referring web page is stored on the site based upon the referrer string;

in response to determining that the user application is authorized and that the referring web page is stored on the site, transmitting the second requested web page to the user application without removing all input data from the second web page request.

16. A system comprising:

a server configured to:

store web pages on a site, the web pages being classified, based on defined criteria, as entry pages that do not accept any input data included in received web page requests from user applications, or protected pages that are not entry pages, wherein the web pages are organized such that access to each of the protected pages is provided via an access path over one of the entry pages; and a gateway configured to:

receive a first web page request from a user application to receive a first requested web page stored on the site, the first web page request including a referrer string indicative of a referring web page, and identification data, determine whether the first requested web page is one of the entry pages or one of the protected pages, in response to determining that the first requested web page is one of the entry pages, remove all input data from the first web page request to produce a stripped first web page request, in response to determining that the first requested web page is one of the protected pages, determine whether the user application is authorized to access the protected page based upon the identification data, and whether the referring web page is stored on the site based upon the referrer string, and in response to determining that the user application is not authorized to access the protected page or that the referring web page is not stored on the site, remove all input data from the first web page request to produce the stripped first web page request, and transmit one of the entry pages specified in the stripped first web page request to the user application.

17. The system of claim 16, wherein the gateway is further configured to:

receive a second web page request to receive a second requested web page, the second web page request including a referrer string indicative of a referring web page, and identification data;

determine that the second requested web page is a protected page;

in response to determining that the second requested web page is a protected page, determine whether the user application is authorized based upon the identification data, and whether the referring web page is stored on the site based upon the referrer string;

in response to determining that the user application is authorized and that the referring web page is stored on the site, effectuate transmission of the second requested web page to the user application without removing all input data from the second web page request.

18. A machine-readable storage device comprising program instructions that, when read by a machine, operate to cause a data processor apparatus to:

store web pages on a site, the web pages being classified, based on defined criteria, as entry pages that do not accept any input data included in received web page requests from user applications, or protected pages that are not entry pages, wherein the web pages are organized such that access to each of the protected pages is provided via an access path over one of the entry pages;

receive a first web page request from a user application to receive a first requested web page stored on the site, the first web page request including a referrer string indicative of a referring web page, and identification data;

determine whether the first requested web page is one of the entry pages or one of the protected pages;

in response to determining that the first requested web page is one of the entry pages, remove all input data from the first web page request to produce a stripped first web page request;

in response to determining that the first requested web page is one of the protected pages, determine whether the user application is authorized to access the protected page based upon the identification data, and whether the referring web page is stored on the site based upon the referrer string; and in response to determining that the user application is not authorized to access the protected page or that the referring web page is not stored on the site, remove all input data from the first web page request to produce the stripped first web page request, and transmit one of the entry pages specified in the stripped first web page request to the user application.

19. The machine-readable storage device of claim 18, wherein the program instructions further cause the data processing apparatus to:

receive a second web page request to receive a second requested web page, the second web page request including a referrer string indicative of a referring web page, and identification data;

determine that the second requested web page is a protected page;

in response to determining that the second requested web page is a protected page, determine whether the user application is authorized based upon the identification data, and whether the referring web page is stored on the site based upon the referrer string;

in response to determining that the user application is authorized and that the referring web page is stored on the site, transmit the second requested web page to the user application without removing all input data from the second web page request.

* * * * *